United States Patent
Shinkawa et al.

(10) Patent No.: US 12,123,083 B2
(45) Date of Patent: Oct. 22, 2024

(54) AUSTENITIC NON-MAGNETIC STEEL, POWDER METAL MATERIAL FOR ADDITIVE MANUFACTURING, AND METHOD FOR PRODUCING AUSTENITIC NON-MAGNETIC STEEL

(71) Applicant: HONDA MOTOR CO., LTD., Tokyo (JP)

(72) Inventors: Masaki Shinkawa, Saitama (JP); Kazuo Kikawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/117,838

(22) Filed: Mar. 6, 2023

(65) Prior Publication Data
US 2023/0313351 A1    Oct. 5, 2023

(30) Foreign Application Priority Data

Mar. 31, 2022  (JP) ................. 2022-061344

(51) Int. Cl.
| | |
|---|---|
| *C22C 38/38* | (2006.01) |
| *B33Y 70/00* | (2020.01) |
| *C22C 38/00* | (2006.01) |
| *C22C 38/22* | (2006.01) |
| *C22C 38/24* | (2006.01) |

(52) U.S. Cl.
CPC .............. *C22C 38/38* (2013.01); *B33Y 70/00* (2014.12); *C22C 38/001* (2013.01); *C22C 38/22* (2013.01); *C22C 38/24* (2013.01)

(58) Field of Classification Search
CPC ....... B33Y 70/00; C22C 38/001; C22C 38/22; C22C 38/24; C22C 38/38; C22C 33/02
See application file for complete search history.

(56) References Cited

U.S. PATENT DOCUMENTS

| | | | | |
|---|---|---|---|---|
| 2,876,096 A | * | 3/1959 | Payson | .................. C21D 8/005 420/59 |
| 2008/0141826 A1 | * | 6/2008 | Marya | .................. C22C 38/001 75/331 |
| 2023/0063669 A1 | * | 3/2023 | Mohr | ...................... B22F 10/64 |

FOREIGN PATENT DOCUMENTS

| | | | | | |
|---|---|---|---|---|---|
| GB | 2115834 A | * | 9/1983 | ............. | C22C 38/04 |
| JP | S5964738 A | * | 4/1984 | | |
| JP | 2021-195588 A | | 12/2021 | | |
| WO | WO-2021148404 A1 | * | 7/2021 | ................ | B22F 1/00 |

\* cited by examiner

*Primary Examiner* — Jenny R Wu

(74) *Attorney, Agent, or Firm* — Paratus Law Group, PLLC

(57) ABSTRACT

An austenitic non-magnetic steel containing: 8.0 to 15.0 mass % of Mn; 0.05 to 0.50 mass % of N; 0.20 to 1.00 mass % of C; 2.0 to 15.0 mass % of Cr; and 3.0 mass % or less of V, and a powder metal material for additive manufacturing, which is an austenitic non-magnetic steel containing: 8.0 to 15.0 mass % of Mn; 0.20 to 1.00 mass % of C; 2.0 to 15.0 mass % of Cr; and 3.0 mass % or less of V.

7 Claims, No Drawings

AUSTENITIC NON-MAGNETIC STEEL, POWDER METAL MATERIAL FOR ADDITIVE MANUFACTURING, AND METHOD FOR PRODUCING AUSTENITIC NON-MAGNETIC STEEL

CROSS-REFERENCE TO RELATED APPLICATION

This application is based on and claims priority under 35 USC 119 from Japanese Patent Application No. 2022-061344 filed on Mar. 31, 2022.

TECHNICAL FIELD

The present invention relates to an austenitic non-magnetic steel, a powder metal material for additive manufacturing, and a method for producing an austenitic non-magnetic steel.

BACKGROUND ART

Conventionally, among nickel alloys, cobalt alloys, and titanium alloys, there is known an alloy which is non-magnetic and have a strength of 1,500 MPa or more. Nickel alloys, cobalt alloys, and titanium alloys, which are non-magnetic and have a strength of 1,500 MPa or more, contain large amounts of rare elements, are expensive, and have a high resource risk.

Conventionally, an additive manufacturing technique has been developed in consideration of durability. JP2021-195588A discloses a method for producing an iron alloy, in which an iron alloy is produced by using a metal additive manufacturing method.

SUMMARY OF INVENTION

However, in the technique in the conventional art, no consideration is given to a high strength, no consideration is given to a strength (1500 MPa or more) and an elongation against a large external force, and it is not particularly suitable for use as a material in a portion where a large external force is to be applied (such as a rotor body of a high rotation electric machine). In addition, an austenitic non-magnetic steel having the above-recited strength and elongation is non-magnetic and can provide various manufactured articles, but it has been difficult to obtain such an austenitic non-magnetic steel.

The present invention provides an austenitic non-magnetic steel having a high strength and an excellent elongation, a powder metal material for additive manufacturing, and a method for producing an austenitic non-magnetic steel.

(1) The present invention provides, as an aspect, an austenitic non-magnetic steel containing:
in terms of mass %,
Mn: 8.0% to 15.0%;
N: 0.05% to 0.50%;
C: 0.20% to 1.00%;
Cr: 2.0% to 15.0%; and
V: 3.0% or less.

(2) The present invention provides, as an aspect, a powder metal material for additive manufacturing, which is an austenitic non-magnetic steel containing, in terms of mass %,
Mn: 8.0% to 15.0%,
C: 0.20% to 1.00%,
Cr: 2.0% to 15.0%, and
V: 3.0% or less.

According to the present invention, it is possible to provide an austenitic non-magnetic steel having a high strength and an excellent elongation, a powder metal material for additive manufacturing, and a method for producing an austenitic non-magnetic steel.

DETAILED DESCRIPTION OF THE INVENTION

Hereinafter, embodiments for carrying out the present invention will be described in detail.

<Austenitic Non-Magnetic Steel>

An austenitic non-magnetic steel according to the present invention contains:
in terms of mass %,
Mn: 8.0% to 15.0%;
N: 0.05% to 0.50%;
C: 0.20% to 1.00%;
Cr: 2.0% to 15.0%; and
V: 3.0% or less.

Note that unless otherwise specified, the content of each alloying element is a mass-based value based on 100% of the entire austenitic non-magnetic steel.

The austenitic non-magnetic steel according to the present invention contains 8.0% to 15.0% of Mn.

Mn is an essential additive element for making the above-recited steel into an austenite structure and obtaining non-magnetism. In consideration of the synergistic effect with N and C added at the same time, an austenite structure can be obtained when the content of Mn is 8.0% or more. On the other hand, the content of Mn is preferably 15.0% or less in consideration of the stability and strength saturation of the austenite structure, and further in consideration of ignition due to static electricity or the like.

The content of Mn is preferably 10.0% to 15.0%, and more preferably 10.0% to 12.0%.

Note that an austenitic steel material containing a large amount of Mn is called a high-manganese steel, and is known as a difficult-to-process material. The austenitic steel material is mainly produced only by casting, but is preferably produced by additive manufacturing, for example, by net shaping, whereby the processability can be improved.

The austenitic non-magnetic steel according to the present invention contains 0.05% to 0.50% of N.

N has the effect of stabilizing the austenite structure, forming a solid solution in the austenite structure, and forming a nitride with Cr and V to increase the strength. N is also effective in improving the corrosion resistance. In order to obtain these effects, the content of N is set to 0.05% or more. On the other hand, when the content of N is more than 0.50%, there is a problem that voids are likely to occur due to gasification during additive manufacturing in the production of the austenitic non-magnetic steel, so that the content of N is set to 0.50% or less.

The content of N is preferably 0.10% to 0.50%, and more preferably 0.15% to 0.25%.

It is sufficient that N is contained at the stage of a product, that is, the austenitic non-magnetic steel.

For example, N may be contained at the stage of a raw material powder, or may be added by controlling the atmosphere during processing of the raw material powder. N may be added by adding a nitrogen addition treatment during the additive manufacturing. As described above, N may be contained at the stage of the austenitic non-magnetic steel.

The austenitic non-magnetic steel according to the present invention contains 0.20% to 1.00% of C.

C has the effect of solid-solution strengthening the austenite structure and forming a carbide with Cr and V to increase the strength. In order to obtain these effects, the content of C is set to 0.20% or more. On the other hand, when the content of C is more than 1.00%, the elongation is reduced, so that the content of C is set to 1.00% or less.

The content of C is preferably 0.30% to 0.90%, and more preferably 0.30% to 0.40%.

The austenitic non-magnetic steel according to the present invention contains 2.0% to 15.0% of Cr.

Cr is effective in increasing the amount of nitrogen added, improving the strength by forming a carbonitride, and improving the corrosion resistance. In order to obtain these effects, the content of Cr is set to 2.0% or more. On the other hand, when the content of Cr is more than 15.0%, the strength becomes saturated, so that the content of Cr is set to 15.0% or less.

The content of Cr is preferably 3.0% to 13.0%, more preferably 4.0% to 12.0%, and still more preferably 5.0% to 11.0%.

The austenitic non-magnetic steel according to the present invention contains 3.0% or less of V.

The austenitic non-magnetic steel according to the present invention may or may not contain V, but since V improves the strength by forming a carbonitride, the austenitic non-magnetic steel desirably contains V. When the austenitic non-magnetic steel contains V, the content of V may be more than 0 mass %. On the other hand, when the content of V is more than 3.0%, a nitride and the like are excessively generated and the ductility is lowered, so that the content of V is set to 3.0% or less.

When the austenitic non-magnetic steel contains V, the content of V is preferably 0.5% to 2.5%, more preferably 0.5% to 2.0%, and still more preferably 0.7% to 1.5%.

The austenitic non-magnetic steel is austenitic. The non-magnetic steel becomes austenitic by containing predetermined amounts of Mn and Cr.

The austenitic non-magnetic steel is a non-magnetic steel. The non-magnetic steel can be confirmed by measuring the relative magnetic permeability.

The relative magnetic permeability is measured by a single plate magnetic property test. Specifically, the relative magnetic permeability is measured for a sample processed into a shape of 10 mm×60 mm×1 mm by using a micro single plate magnetic measuring machine capable of performing measurements according to JIS C 2556.

If the obtained value of the relative magnetic permeability is in the range of 1.00 to 1.02, it is determined to be non-magnetic.

The austenitic non-magnetic steel according to the present invention may contain other elements in addition to the above-recited elements. The other elements are not particularly limited as long as they do not interfere with the effects of the present invention, and examples thereof include Mo.

When the austenitic non-magnetic steel according to the present invention contains Mo, the content of Mo is preferably 3.0 mass % or less, and more preferably 0.5 mass % to 3.0 mass %.

The austenitic non-magnetic steel according to the present invention preferably has the balance being Fe and inevitable impurities in the above-recited chemical composition.

The inevitable impurities are components that can be inevitably mixed from raw materials or the environment during the production of the austenitic non-magnetic steel in the present invention, and examples thereof include Si, P, S, and Cu. The content of Si is generally 1 mass % or less, the content of P or S is generally 0.1 mass % or less, and the content of Cu is 0.5 mass % or less.

The austenitic non-magnetic steel according to the present invention is non-magnetic, and thus does not influence the efficiency of a motor and a generator when applied to the motor and the generator.

When the austenitic non-magnetic steel according to the present invention has a high strength of 1,500 MPa or more and an excellent elongation, in the case of being applied to a rotating member, higher-speed rotation is possible than before, and it is possible to reduce the size and the weight of a motor and a generator.

A product having the above-recited characteristics can be realized at a relatively low cost and low resource risk.

A method for producing the austenitic non-magnetic steel according to the present invention is not particularly limited, and the austenitic non-magnetic steel can be produced, for example, by subjecting an austenitic powder metal for additive manufacturing to additive manufacturing.

As the additive manufacturing, a known method can be used.

<Powder Metal Material for Additive Manufacturing>

A powder metal material for additive manufacturing according to the present invention is made from an austenitic non-magnetic steel containing in terms of mass %, Mn: 8.0% to 15.0%, C: 0.20% to 1.00%, Cr: 2.0% to 15.0%, and V: 3.0% or less.

Note that unless otherwise specified, the content of each alloying element is a mass-based value based on 100% of the entire powder metal material for additive manufacturing.

The powder metal material according to the present invention contains 8.0% to 15.0% of Mn.

Mn is an essential additive element for making the powder metal material into an austenite structure and obtaining non-magnetism. In consideration of the synergistic effect with C added at the same time and N that can be added at the same time, an austenite structure can be obtained when the content of Mn is 8.0% or more. On the other hand, the content of Mn is preferably 15.0% or less in consideration of the stability and strength saturation of the austenite structure, and further in consideration of ignition due to static electricity or the like.

The content of Mn is preferably 10.0% to 15.0%, and more preferably 10.0% to 12.0%.

The powder metal material according to the present invention contains 0.20% to 1.00% of C.

C has the effect of solid-solution strengthening the austenite structure and forming a carbide with Cr and V to increase the strength. In order to obtain these effects, the content of C is set to 0.20% or more. On the other hand, when the content of C is more than 1.00%, the elongation of the obtained austenitic non-magnetic steel is reduced, so that the content of C is set to 1.00% or less.

The content of C is preferably 0.30% to 0.90%, and more preferably 0.30% to 0.40%.

The powder metal material according to the present invention contains 2.0% to 15.0% of Cr.

Cr is effective in increasing the amount of nitrogen added, improving the strength by forming a carbonitride, and improving the corrosion resistance in the obtained austenitic non-magnetic steel. In order to obtain these effects, the content of Cr is set to 2.0% or more. On the other hand, when the content of Cr is more than 15.0%, the strength becomes saturated, so that the content of Cr is set to 15.0% or less.

The content of Cr is preferably 3.0% to 13.0%, more preferably 4.0% to 12.0%, and still more preferably 5.0% to 11.0%.

The powder metal material according to the present invention contains 3.0% or less of V.

The powder metal material according to the present invention may or may not contain V, but since V improves the strength by forming a carbonitride, the powder metal material desirably contains V. When the powder metal material contains V, the content of V may be more than 0 mass %. On the other hand, when the content of V is more than 3.0%, a nitride and the like are excessively generated and the ductility is lowered, so that the content of V is set to 3.0% or less.

When the powder metal material contains V, the content of V is preferably 0.5% to 2.5%, more preferably 0.5% to 2.0%, and still more preferably 0.7% to 1.5%.

The powder metal material according to the present invention may or may not contain, in terms of mass %, 0.05% to 0.5% of N. However, the powder metal material according to the present invention preferably contains, in terms of mass %, 0.05% to 0.5% of N.

The content of N is preferably 0.10% to 0.50%, and more preferably 0.15% to 0.25%.

The powder metal material according to the present invention may contain other elements in addition to the above-recited elements. The other elements are not particularly limited as long as they do not interfere with the effects of the present invention, and examples thereof include Mo.

When the powder metal material according to the present invention contains Mo, the content of Mo is preferably 3 mass % or less, and more preferably 0.5 mass % to 3.0 mass %.

The powder metal material according to the present invention preferably has the balance being Fe and inevitable impurities in the above-recited chemical composition.

The inevitable impurities are components that can be inevitably mixed from raw materials or the environment during the production of the powder metal material in the present invention, and examples thereof include Si, P, S, and Cu. The content of Si is generally 1 mass % or less, the content of P or S is generally 0.1 mass % or less, and the content of Cu is 0.5 mass % or less.

The particle size of the powder metal material according to the present invention is not particularly limited. Known particle sizes suitable for additive manufacturing using a 3D printer (for example, with a wet laser diffraction method, D10≥20 μm and D90≤65 μm in a powder bed fusion method, and D10≥50 μm and D90≤120 μm in a direct energy deposition method) can be used.

A method for producing the powder metal material according to the present invention is not particularly limited, and known methods (for example, a gas atomization method, a water atomization method, a plasma atomization method, a plasma rotating electrode method, and a centrifugal atomization method) can be used.

The powder metal material according to the present invention is a non-magnetic steel. The non-magnetic steel can be confirmed by measuring the relative magnetic permeability.

The relative magnetic permeability is measured by a single plate magnetic property test. Specifically, a 10 mm×60 mm×1 mm measurement piece is prepared from a manufactured body and measured by a micro single plate magnetic measuring machine capable of performing measurements according to JIS C 2556.

If the obtained value of the relative magnetic permeability is in the range of 1.00 to 1.02, it is determined to be non-magnetic.

<Method for Producing Austenitic Non-Magnetic Steel>

The method for producing the austenitic non-magnetic steel according to the present invention includes a step of subjecting the powder metal material to additive manufacturing (referred to as step 1)

Specifically, the step 1 is a step of performing manufacturing using a 3D printer by using the above-recited powder metal material. Accordingly, the austenitic non-magnetic steel can be produced.

The step 1 is 3D printing manufacturing, and manufacturing is performed by cooling after the powder metal material is melted by laser or electron beam irradiation.

As the 3D printer, a known one can be used.

The additive manufacturing method is not particularly limited, and for example, a powder bed fusion method and a direct energy deposition method are preferred.

EXAMPLES

Hereinafter, the present invention will be described more specifically by way of Examples and Comparative Examples, but the present invention is not limited thereto.

Examples 1 to 6 and Comparative Examples 1 to 6

Powder metal materials each having the composition shown in Table 1 below (D10 was 20 μm or more and 25 μm or less and D90 was 60 μm or more and 65 μm or less as measured by a wet laser diffraction method) were produced by a gas atomization method.

The powder metal materials in Examples 1 to 6 in Table 1 were austenitic non-magnetic steels.

The powder metal materials in Examples and Comparative Examples in Table 1 were subjected to additive manufacturing using a 3D printer to produce round bars each having a diameter of 12 mm and a length of 80 mm. M290 manufactured by EOS was used as the manufacturing machine, and the manufacturing conditions included an output of 240 W, a layer thickness of 40 μm, a scan speed of 900 mm/s, a hatch distance of 0.1 mm, and a preheating temperature of room temperature. The obtained round bar was cut on the entire surface and processed into a test piece.

<Measurement of Relative Magnetic Permeability>

The relative magnetic permeability is measured by a single plate magnetic property test. The round bar manufactured article was processed on the entire surface and processed into a 10×60×1 mm test piece, and the relative magnetic permeability was measured with a micro single plate magnetic property tester capable of performing measurements according to JIS C 2556.

The results are shown in the "Relative magnetic permeability" column in Table 1.

<Measurement of Tensile Strength>

The round bar manufactured article was cut on the entire surface to prepare a test piece. A tensile test was performed at room temperature at a tensile speed of 5 mm/min using Autograph manufactured by Shimadzu Corporation. Note that measurement of the tensile strength (MPa) was performed according to JIS Z 2241, and the test piece was a round bar test piece according to JIS No. 14A.

The results are shown in the "Tensile strength (MPa)" column in Table 1.

<Measurement of Elongation>

The elongation of the above-mentioned test piece was measured by measuring, with an extensometer, a change in a distance between scores during the above-mentioned tensile strength measurement.

The results are shown in the "Elongation (%)" column in Table 1.

TABLE 1

| | Chemical component (mass %) | | | | | | Relative magnetic permeability | Tensile strength (MPa) | Elongation (%) |
|---|---|---|---|---|---|---|---|---|---|
| | C | Mn | Cr | V | Mo | N | Fe and inevitable impurities | | |
| Example 1 | 0.31 | 11.8 | 5.3 | 1.0 | 0 | 0.21 | Balance | 1.00 | 1545 | 13.6 |
| Example 2 | 0.81 | 8.0 | 5.2 | 1.2 | 0 | 0.25 | Balance | 1.00 | 1673 | 13.2 |
| Example 3 | 0.84 | 14.1 | 10.2 | 1.2 | 0 | 0.05 | Balance | 1.00 | 1612 | 11.1 |
| Example 4 | 0.21 | 12.2 | 10.3 | 1.2 | 0 | 0.48 | Balance | 1.00 | 1553 | 12.4 |
| Example 5 | 0.80 | 12.0 | 2.0 | 1.2 | 0 | 0.11 | Balance | 1.00 | 1503 | 13.2 |
| Example 6 | 0.70 | 12.0 | 2.2 | 0 | 0.6 | 0.20 | Balance | 1.00 | 1622 | 14.2 |
| Comparative Example 1 | 0.31 | 6.5 | 5.2 | 2.0 | 0 | 0.04 | Balance | 98 | 1734 | 12.8 |
| Comparative Example 2 | 0.82 | 15.1 | 8.0 | 1.0 | 0 | 0.03 | Balance | 1.00 | 1234 | 15.3 |
| Comparative Example 3 | 0.20 | 24.1 | 10.1 | 2.0 | 0 | 0.62 | Balance | 1.00 | 1833 | 3.2 |
| Comparative Example 4 | 0.15 | 23.9 | 5.0 | 2.1 | 0 | 0.10 | Balance | 1.00 | 874 | 25.2 |
| Comparative Example 5 | 1.10 | 20.2 | 10.1 | 2.9 | 0 | 0.02 | Balance | 1.00 | 2023 | 1.1 |
| Comparative Example 6 | 0.3 | 12.0 | 0.6 | 1.0 | 0 | 0.06 | Balance | 1.02 | 985 | 20.2 |

As can be seen from Table 1, according to the powder metal materials in Examples 1 to 6, it is possible to produce an austenitic non-magnetic steel having a high strength and an excellent elongation.

Although the embodiment of the present invention has been described above, the present invention is not limited to the above-described embodiment, and modifications, improvements, and the like can be made as appropriate.

In the present description, at least the following matters are described.

(1) An austenitic non-magnetic steel containing:
in terms of mass %,
Mn: 8.0% to 15.0%;
N: 0.05% to 0.50%;
C: 0.20% to 1.00%;
Cr: 2.0% to 15.0%; and
V: 3.0% or less.

According to (1), an austenitic non-magnetic steel a high strength and an excellent elongation can be obtained. In addition, it is possible to have a strength of 1,500 MPa or more and an excellent elongation, and a non-magnetic steel part (such as a rotor body for a rotation electric machine) that requires a strength to withstand an external force can be obtained, for example, by using powder metal 3D printing additive manufacturing.

(2) A powder metal material for additive manufacturing, which is an austenitic non-magnetic steel containing, in terms of mass %,
Mn: 8.0% to 15.0%,
C: 0.20% to 1.00%,
Cr: 2.0% to 15.0%, and
V: 3.0% or less.

According to (2), by using the above-recited powder metal material and introducing nitrogen into the austenitic non-magnetic steel of (2), it is possible to produce the austenitic non-magnetic steel in (1) by, for example, powder metal 3D printing additive manufacturing.

(3) The powder metal material according to (2), further containing:
in terms of mass %,
N: 0.05% to 0.5%.

According to (3), by using the above-recited powder metal material, it is possible to produce the austenitic non-magnetic steel in (1) by, for example, powder metal 3D printing additive manufacturing.

(4) A method for producing an austenitic non-magnetic steel including: a step of subjecting the powder metal material according to (2) or (3) to additive manufacturing.

According to (4), the austenitic non-magnetic steel in (1) can be produced.

What is claimed is:

1. An austenitic non-magnetic steel consisting of:
8.0 to 15.0 mass % of Mn;
0.05 to 0.50 mass % of N;
0.20 to 1.00 mass % of C;
2.0 to 15.0 mass % of Cr;
0.5 mass % or more of V, and 1.2 mass % or less of V, and
a balance being Fe and inevitable impurities,
wherein the austenitic non-magnetic steel has a tensile strength of 1500 MPa or more and an elongation of 11.1% or more.

2. The austenitic non-magnetic steel according to claim 1, wherein the elongation is 11.1% to 14.2%.

3. The austenitic non-magnetic steel according to claim 1, wherein the N is present in an amount of 0.05 mass % or more and 0.19 mass % or less.

4. A powder metal material for additive manufacturing, which is an austenitic non-magnetic steel consisting of:
10.0 to 15.0 mass % of Mn;
0.20 to 1.00 mass % of C;
2.0 to 15.0 mass % of Cr;
0.5 mass % or more of V, and 1.2 mass % or less of V,
optionally 0.05 to 0.5 mass % of N, and
a balance being Fe and inevitable impurities, wherein following the additive manufacturing, the austenitic non-magnetic steel has a tensile strength of 1500 MPa or more and an elongation of 11.1% or more.

5. The powder metal material for additive manufacturing according to claim 4, wherein the elongation is 11.1% to 14.2%.

6. The powder metal material for additive manufacturing according to claim 4, wherein the N is present in an amount of 0.05 mass % or more and 0.19 mass % or less.

7. A method for producing an austenitic non-magnetic steel comprising:

subjecting the powder metal material according to claim 4 to additive manufacturing.

\* \* \* \* \*